Sept. 14, 1943.  M. H. GRAHAM ET AL  2,329,608
TEA MAKING APPARATUS
Filed Feb. 10, 1941  2 Sheets-Sheet 1

INVENTORS
MAURICE H. GRAHAM
THOMAS C. FORBES

ATTORNEYS

Sept. 14, 1943.   M. H. GRAHAM ET AL   2,329,608
TEA MAKING APPARATUS
Filed Feb. 10, 1941   2 Sheets-Sheet 2
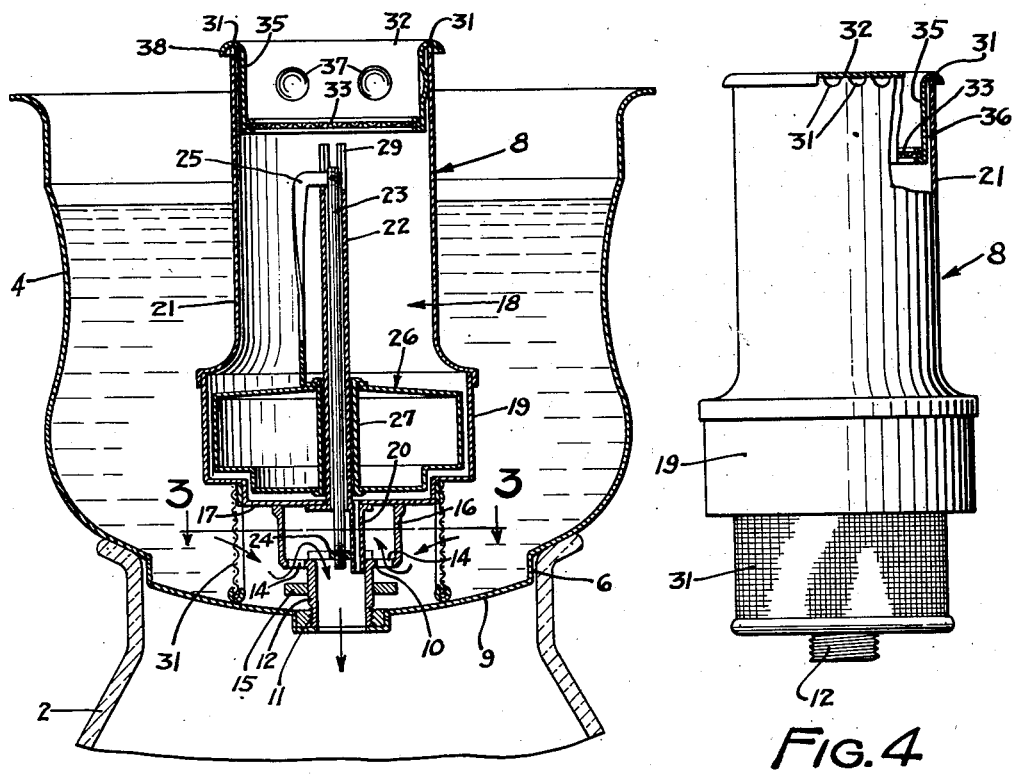
Fig. 2
Fig. 4
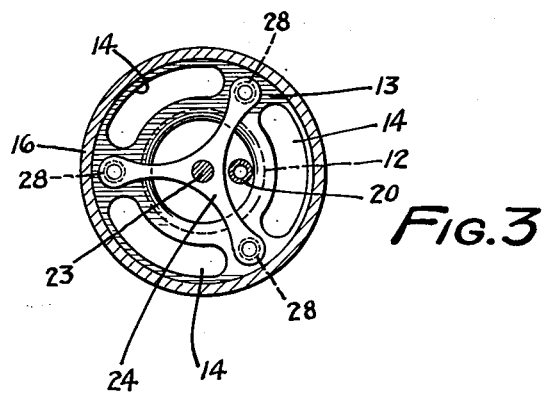
Fig. 3
INVENTORS
MAURICE H. GRAHAM
THOMAS C. FORBES
By Paul, Paul & Moore
ATTORNEYS Patented Sept. 14, 1943

2,329,608

UNITED STATES PATENT OFFICE 2,329,608

TEA MAKING APPARATUS

Maurice H. Graham, St. Louis Park, and Thomas C. Forbes, Hopkins, Minn.; said Forbes assignor to said Graham Application February 10, 1941, Serial No. 378,226

4 Claims. (Cl. 53—3)

This invention relates to new and useful improvements in tea making apparatus and more particularly to such apparatus having means for accurately timing the steeping or infusion period thereof.

It is well known, that to make good tea, it is of utmost importance that the leaves be steeped in boiling water a predetermined length of time, the duration of which is based upon the time required to obtain the abstraction from the tea leaves of the usual theine or caffeine without extracting the detrimental tannic acid therefrom. Attempts have heretofore been made to provide means in a tea making apparatus for automatically controlling the length of the steeping period, but to the best of my knowledge, none of these have proven satisfactory. Some of these have utilized a small metering orifice through which a portion of the brewed tea or beverage flows into an auxiliary chamber to actuate a device such as a float, which subsequently opens a valve and permits the brewed tea to quickly discharge from the infusion chamber into a suitable receiving chamber or receptacle. Such apparatus is shown in the pending application of Maurice H. Graham, Ser. No. 303,070, filed November 6, 1939, and in the patent to Albert Ford, No. 1,439,665. I have found that the brewed tea usually contains a small percentage of foreign matter, even though it may have been passed through a conventional strainer or filter, which has a tendency to adhere to the walls of the infusion chamber and particularly to the wall of the metering orifice, whereby, after a short period of use, the length of steeping or infusion period may be materially increased, thereby causing tannic acid to be released from the tea leaves into the tea. This obviously is objectionable and may materially affect the flavor of the tea.

The novel tea making apparatus herein disclosed, like those shown in the above mentioned application and patent, comprises a small metering orifice which controls the length of the steeping or infusion period. The present apparatus, however, distinguishes from those of said application and patent in that clear water only is permitted to flow through the metering orifice, whereby there is no danger of the orifice becoming clogged by foreign matter which may be contained in the brewed tea.

It is therefore an object of the present invention to provide a tea making apparatus comprising an infusion chamber by a discharge opening provided with a suitable valve, and a timing mechanism comprising a float chamber having a float therein for actuating said valve, said float chamber being adapted to receive fresh water and having a metering orifice in the lower portion through which the water may gradually drain from the float chamber and subsequently cause the float to open the valve and permit the brewed tea to drain from the infusion chamber.

A further object is to provide a tea making apparatus comprising a container having a discharge opening in its lower portion and a timing mechanism being removably supported in said container and comprising a float chamber open at the top and having a float therein having an operative connection with a valve provided in the lower portion of the timing mechanism adapted to normally close a valve opening, when the float is in elevated position, thereby to prevent premature discharging of the liquid from the container during the steeping period, and said float chamber having a metering orifice in the lower portion thereof through which a portion of the clear water delivered to the float chamber may gradually discharge therefrom, until the float eventually assumes a position to open to the valve, whereby the liquid or tea in the container may quickly discharge therefrom through said open valve.

A further object is to provide a tea making apparatus of the class described comprising a container wherein the tea is steeped, and a receptacle for receiving the brewed tea from said container, after a predetermined time interval, and a suitable timing mechanism being removably supported in the container adapted to be actuated by clear water delivered thereinto, when the steeping or infusion period is initially started, and whereby the operating parts of the timing mechanism are not affected by foreign matter or particles which may be entrained with the brewed tea.

Other objects of the invention reside in the simple and inexpensive construction of the timing mechanism; in the unique manner of supporting it in the container and whereby it may readily be assembled as a unit, independently of the container in which it is supported when in operation; in the filtering element provided at the lower portion of the timing unit adapted to engage the bottom wall of the container and prevent the tea leaves from passing into the receiving receptacle or pot, when the brewed tea is discharged from the upper container; in the means provided at the upper end of the timing mechanism for releasing air from the float chamber, when the latter is quickly filled with boiling water, as when initially starting the infusion period; and in the unique manner of supporting the float within the float chamber, whereby friction is reduced to a minimum, and whereby the float may quickly respond to variations in the level of the water within the float chamber.

Other objects of the invention will appear from the following description and accompanying drawings and will be pointed out in the annexed claims.

Figure 2 is a view similar to the upper portion of Figure 1, but showing the float in valve-opening position;

Figure 3 is an enlarged detail sectional plan view on the line 3—3 of Figure 2; and Figure 4 is a side elevational view of the timing mechanism removed from the apparatus.

Figure 1:
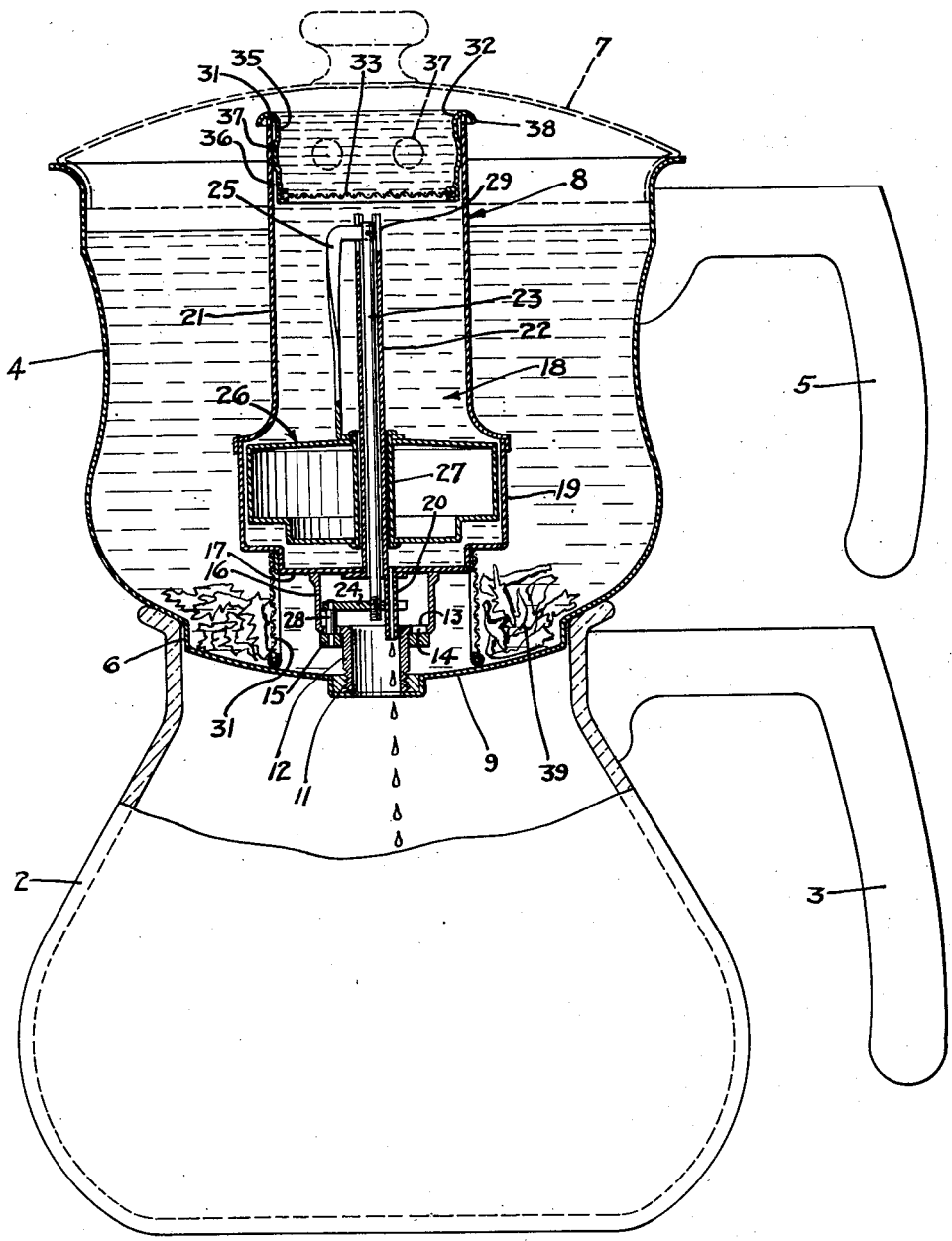
Figure 1 is a side elevational view of a tea making apparatus with the upper portion broken away to show the invention embodied therein, the float being shown in valve closing position.

In the selected embodiment of the invention here shown, there is illustrated in Figure 1, for purposes of disclosure, a tea making apparatus comprising a lower receptacle or pot 2 having a suitable handle 3, and an upper container 4 shown provided with a suitable handle 5. The container 4 may have its lower portion formed with an annular cylindrical wall portion 6, adapted to be received in the mouth of the receptacle 2, thereby to support the container in position thereon. A suitable cover 7, indicated by the dotted lines in Figure 1, may be provided for the upper container 4.

An important feature of the present invention resides in the means provided for controlling the length of the steeping period, whereby successive quantities of tea made in the apparatus may be identical in flavor, provided, of course, that the same proportions of tea leaves and boiling water are used for each pot of tea. The means provided for thus controlling the steeping or infusion period is shown comprising a timing mechanism, generally designated by the numeral 8, which is removably supported in the container 4, as will be subsequently described. The bottom wall 9 of the container 4 is shown provided with a threaded discharge opening 11 adapted to receive the lower end of a threaded nipple 12, which forms a part of the timing mechanism.

The nipple 12, as clearly illustrated in Figures 1 and 2, terminates at its upper end in a horizontal wall 13, provided with a series of openings 14. The bottom face of the wall 13 provides a valve seat 10, adapted to be engaged by an annular valve 15. The outer marginal edge of the horizontal wall 13 is shown secured to or integrally formed with a cylindrical wall 16 having its upper end suitably secured to a horizontal wall 17 forming the bottom of a suitable float chamber 18. The float chamber is defined by an enlarged cylindrical wall portion 19, and a cylindrical portion 21 which extends upwardly into the container 4 from the wall portion 19, and preferably has its upper end extending slightly above the upper end of the container 4, although, not necessarily so.

A hollow post or guide member 22 is shown having its lower end secured to the bottom wall 17 of the float chamber 18, and extends upwardly into the float chamber to provide a vertical guide for a stem 23, having its lower end preferably loosely connected to a suitable spider 24. The upper end of the stem 23 is suitably secured to the upper end of an arm 25 secured to a float 26. The float is provided at its center with a tubular member 27 adapted to receive the hollow post 22 and whereby said post provides a vertical guide for the float 26.

The spider 24 is operatively connected to the annular valve 15 by a plurality of shouldered studs 28 which traverse the elongated openings 14 in the wall 13, as clearly illustrated in Figures 1 and 3. Thus, it will be seen that vertical movement of the float in the chamber 18 will impart vertical movement to the valve 15, whereby the latter may be moved into or out of engagement with the valve seat 10 by variations in the lever of the water in the float chamber 18. The upper end of the hollow post 22 is preferably forked, as shown at 29 to provide a guide for the upper offset end portion of the arm 25, and to prevent said arm from relatively rotating with respect to the post 22.

A suitable screen or filter member, generally designated by the numeral 31, is suitably secured to the lower wall portion of the float chamber 18, and has its lower edge arranged to engage the bottom wall 9 of the container 4, when the timing mechanism is secured in position therein, as shown in Figures 1 and 2.

Another feature of the invention resides in the means provided at the upper end of the cylindrical wall 21 of the timing mechanism for permitting air in the float chamber from quickly escaping therefrom, when water is quickly poured into the float chamber through the upper open end thereof. To thus permit air to quickly escape from the float chamber 18 when it is filled with water, the upper edge of the cylindrical wall 21 of said chamber is notched or serrated, as shown at 31 in Figure 4, whereby a plurality of air vents or ducts are provided around the entire circumference of the upper end of the wall portion 21. A suitable closure member, generally designated by the numeral 32, having a screen bottom 33, is removably mounted in the upper portion of the wall portion 21. The cylindrical wall 35 of the closure member 32 is smaller in diameter than the inside diameter of the wall 21 to provide an annular air passage 36 between the walls 21 and 35, as will be readily noted by reference to Figure 4. Suitable projections 37, preferably integrally formed in the metal, are provided in the wall 35 to axially retain the closure member 36 within the chamber provided by the wall 21. The upper marginal edge of the wall 35 of the closure member 32 is outwardly and downwardly rolled, as shown at 38, to provide a finished appearance for the upper end of the timing mechanism and also to facilitate removal of the closure member 36 from the wall 21.

In the operation of the novel tea making apparatus herein disclosed, the timing mechanism 8 is secured in position within the container 4 by screwing the threaded nipple 12 thereof into the threaded socket 11 forming the discharge opening for the container 4. When the timing mechanism has thus been secured in place, the lower edge of the filter member 31 will engage the bottom wall of the container 9, as shown. A measured quantity of tea leaves is then delivered into the container 4 in the annular space provided between the timing mechanism and the upright wall of the container 4, and drops to the bottom of the container, as shown at 39 in Figure 1.

A measured quantity of water is then poured into the upper end of the timing mechanism and quickly fills the float chamber 18 with clear water, whereby the float is elevated and the valve 15 moved into closing engagement with the valve seat 10, as shown in Figure 1. When the float chamber has been completely filled, the remaining portion of the measured quantity of water will flow over the top thereof into the container 4, until the entire measured quantity of water has been poured into the float chamber and container 4. The cover may then be replaced upon the container 4.

As soon as the proper quantity of water has thus been introduced into the float chamber and container 4, the steeping or infusion period commences, and will continue so long as the float remains in its elevated valve-closing position, shown in Figure 1. As the level of the water in the float chamber gradually drains therefrom through a metering orifice or duct defined by a small tube 20, shown in Figure 1, the level of the water in the float chamber will gradually recede until the float 26 will drop by gravity from its valve-closing position shown in Figure 1, to valve-opening position, shown in Figure 2, whereby the valve 15 is moved out of engagement with the valve seat 10 and thereby opens the elongated openings 14, whereby the brewed or steeped tea in the container 4 may quickly drain therefrom into the lower receiving receptacle or pot 2, as clearly indicated by the arrows in Figure 2. The tea delivered into the receptacle 2 will be clear and sparkling, as all of the tea leaves and other foreign matter contained in the container 2 will be retained therein by the screen or filter member 31.

When all of the brewed tea has drained from the container 4 into the receptacle 2, the container 4 and timing mechanism may, if desired, be removed from the receptacle 2 and a suitable cover, not shown, substituted therefor. The timing mechanism may then be removed from the container as a unit for cleaning or other purposes. It will thus be seen that the operation of the apparatus is extremely simple, the important feature being that when the boiling water is delivered into the container 4 in the operation of starting the steeping period, the float chamber 18 must be filled with clear water before the timing mechanism can function.

We have found, from considerable experimental and research work, over an extended period of time, that by allowing only pure water to pass through the metering orifice defined by the tube 20, the danger of the passage therethrough becoming clogged or unduly restricted from foreign deposits, is practically entirely eliminated, whereby the apparatus may be repeatedly used over a long period of time without any variations in the infusion period. It will also be noted that the timing mechanism is self-contained and may readily be removed and thoroughly cleaned with a very little effort, which is highly desirable in apparatus of this general type.

We claim as our invention:

1. In an apparatus of the class described, a container providing an infusion chamber adapted to receive measured quantities of tea leaves and water, said container having a discharge opening whereby the brewed tea may be quickly drained therefrom, a timing mechanism comprising a casing having an open top disposed above the top of the container and provided at its bottom with a restricted passage whereby water in the casing may gradually drain therefrom, a valve for said discharge opening, and a float within the casing having an operative connection with the valve whereby when substantially all the water in the casing has drained therefrom, the float will be operated to open the valve and permit the brewed tea to quickly drain from the infusion chamber, and cooperating means in the bottom wall of the container and on the lower end of the timer casing adapted for interlocking engagement to removably secure the casing in the container.

2. In an apparatus for making tea, a container providing an infusion chamber adapted to receive measured quantities of tea leaves and water, said container having a suitable discharge opening in its bottom wall, a timing mechanism for controlling the length of the infusion or steeping period, said timing mechanism being in the form of a unitary structure comprising a casing defining a float chamber having a float therein provided with a valve for closing the discharge opening in the container, when the float chamber is filled with water to start the infusion period, said float chamber having a restricted passage whereby the water therein may gradually drain therefrom and subsequently permit the float to descend and open the valve and allow the tea to quickly discharge from the infusion chamber, means for removably supporting the timer casing within the container whereby said casing, including the float and valve, may be removed from the container as a unit, and a suitable screen depending from the lower portion of the timer casing with its lower edge adapted to engage the bottom wall of the container, whereby tea leaves in the container cannot enter the discharge opening or contact the valve, when the brewed tea is draining from the container.

3. In an apparatus of the class described, a container providing an infusion chamber adapted to receive measured quantities of tea leaves and water, said container having a discharge opening in its bottom wall, a unitary timing mechanism comprising a casing having an extension at its lower end adapted to be received in said discharge opening, said timing mechanism having a valve opening in its lower end for establishing communication between the container and said extension, a valve for closing said valve opening, and a float within the casing having an operative connection with said valve and adapted to close the valve, when water is initially introduced into said casing, and said casing having a restricted passage in its bottom wall through which water may gradually drain therefrom, whereupon the float is subsequently operated to open the valve to permit the infusion in the container to quickly drain therefrom.

4. In an apparatus of the class described, a container providing an infusion chamber adapted to receive measured quantities of tea leaves and water, said container having a threaded discharge opening in its bottom wall, a unitary timing mechanism comprising a casing having a nipple at its lower end adapted to be received in threaded engagement with said threaded discharge opening, said timing mechanism having a valve opening in its lower end for establishing communication between the container and said nipple, a valve for closing said valve opening, and a float within the casing having an operative connection with said valve and adapted to close the valve, when water is initially introduced into said casing, and said casing having a restricted passage in its bottom wall through which water may gradually drain therefrom, whereupon the float is subsequently operated to open the valve to permit the infusion in the container to quickly drain therefrom.

MAURICE H. GRAHAM.
THOMAS C. FORBES.

CERTIFICATE OF CORRECTION.

Patent No. 2,329,608. September 14, 1943.

MAURICE H. GRAHAM, ET AL.

It is hereby certified that error appears in the printed specification of the above numbered patent requiring correction as follows: Page 1, second column, line 19, after "open" strike out "to"; page 2, second column, line 6, for "lever" read --level--; and that the said Letters Patent should be read with this correction therein that the same may conform to the record of the case in the Patent Office.

Signed and sealed this 29th day of February, A. D. 1944.

Leslie Frazer (Seal)

Acting Commissioner of Patents.